June 17, 1924.

Re. 15,860

E. H. MEDÉN

ONE-WAY STREET TRAFFIC SIGNAL

Original Filed June 17, 1922

WITNESS

F. J. Hartman.

Elof H. Medén, deceased, INVENTOR
American Gasaccumulator Company, assignee,
BY
Cyrus N. Anderson
ATTORNEY Reissued June 17, 1924. Re. 15,860

UNITED STATES PATENT OFFICE.

ELOF H. MEDÉN, DECEASED, LATE OF SHORT HILLS, NEW JERSEY; BY AMERICAN GASACCUMULATOR COMPANY, OF ELIZABETH, NEW JERSEY, ASSIGNEE.

ONE-WAY-STREET TRAFFIC SIGNAL.

Original No. 1,484,840, dated February 26, 1924, Serial No. 568,977, filed June 17, 1922. Application for reissue filed May 3, 1924. Serial No. 710,957.

*To all whom it may concern:*

Be it known that ELOF H. MEDÉN, deceased, formerly a subject of the King of Sweden, and a resident of Short Hills, in the county of Union and State of New Jersey, did invent an Improvement in One-Way-Street Traffic Signals, of which the following is a specification.

The handling of vehicular traffic in cities, particularly the crowded portions or sections thereof, is a somewhat difficult problem on account of the great numbers of automobiles, trucks and the like which are moving to and fro through the streets, and in many cities, in an effort to simplify and obtain better control of such traffic, one-way streets have been established.

The purpose of this invention is to provide a mechanical means for indicating to the traveling public that a street is a one-way street with respect to vehicular traffic and to indicate further the direction in which such travel may move through such street.

The general object of the invention is to provide means for facilitating traffic in crowded sections of cities and for relieving the police and others of a great deal of work which must now be done by them in directing traffic through the proper streets.

A further object of the invention is to provide means of a character which is adapted to stand out prominently within or adjacent such one-way street and which also is adapted to present signals to approaching vehicular traffic by which the attention of such traffic is arrested.

Other objects and advantages of the invention will be pointed out in the detailed description which follows or will be apparent from such description, and in order that the invention may be readily understood and its practical advantages fully appreciated, reference should be had to the accompanying drawing in which—

Figure 1:
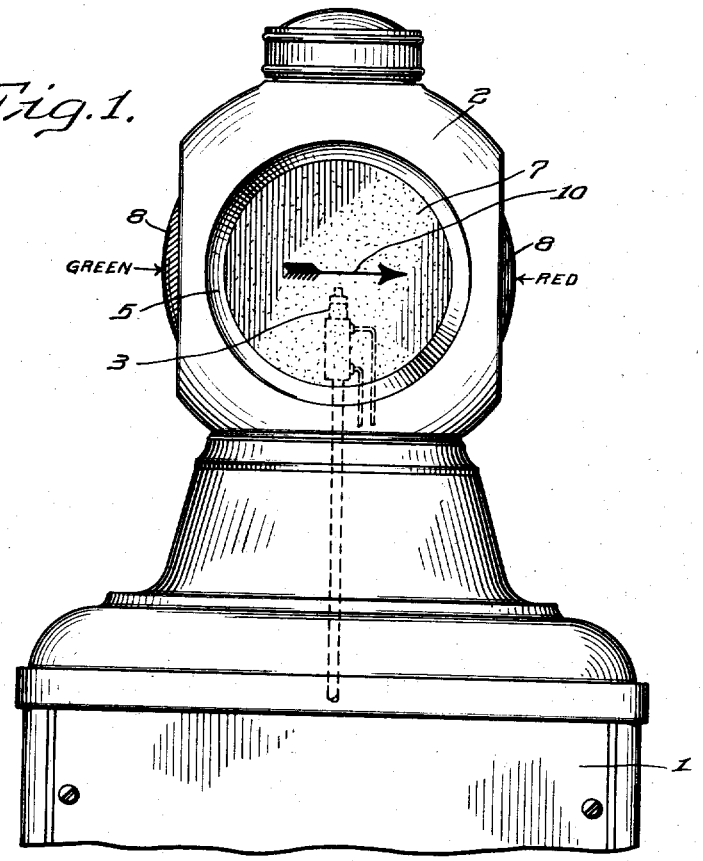
Figure 2:
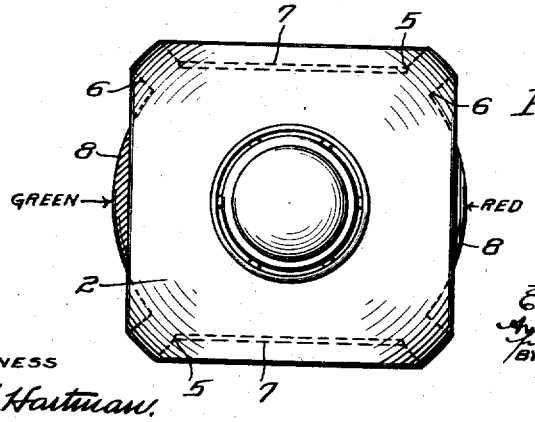

Fig. 1 is a side elevation of the signaling device and of the upper portion of the pedestal or standard on which it is supported; and Fig. 2 is a top plan view thereof.

Referring to the drawing: 1 designates the pedestal or support for the signaling and directing device which comprises a hollow head 2 within which a suitable light is adapted to show either in flashes or continuously. Such light may be of any character desired, as for instance, a gas burning light produced by a burner such as the burner 3 indicated in dotted lines in Fig. 1 of the drawing.

The hollow head 2 is provided with four openings 5 and 6, as indicated, arranged within the four quadrants or segments of the globular hollow head 2, or, in other words, in ninety degree relation with respect to each other. The openings 5 are closed by means preferably of translucent plates or sheets such as frosted glass 7, while the openings 6 are closed by means of concentrating or other lenses 8 of any preferred or known construction. The lenses 8 are of different colors, one being red, as indicated, and the other green. The former indicates that traffic must not move or travel upon the street in a direction opposing the red signal. The green signal indicates that the street is open and free to traffic moving or traveling toward such signal. The peripheral edges of the plates 7 and of the lenses 8 are secured to the spherical head 2 inwardly of the walls thereof so that in the case of the plates 7 they are situated wholly inwardly of the planes of the outer edges of the openings in the head 2 while in the case of the lenses 8 only the central portions of the outer spherical surfaces thereof project beyond the planes of the outer edges of the openings in which they are situated.

Assuming that a traffic signal of the character above indicated is located upon a street: a person approaching the same and observing the red signal would thereby be informed that he could not travel further in that direction on that street, but if in approaching the said signal he observed that the green signal was facing him, he would thereby be informed that traffic in that direction on the said street was open and that he was free to continue in that direction. As a further indication of the direction in which traffic is permitted to move or flow arrows 10 are provided upon the translucent plates 7 within the openings 5.

The presence of the openings having the translucent plates 7 therein permits the emission of light rays so that the signal also operates as an illuminating device for pedestrians, because the said openings 5 and the translucent plates 7 face transversely of the street the vehicular traffic on which is controlled and guided by the signals or information given by the lenses 8. Although these lenses are described as being red and green respectively, it will be understood that they may be of other different contrasting colors.

The essential idea of the invention is that the device shall be provided with means of the character indicated to inform vehicular traffic as to the direction in which traffic on a certain street may move, combined with means whereby illuminating rays may be emitted in directions substantially at right angles to the direction of the emission of rays through the said means.

It will thus be seen that I have provided a device which is well adapted for use upon or adjacent one-way streets for directing and controlling the vehicular traffic upon such streets.

Having thus described the invention, what is claimed is:

In a one-way street traffic signal, the combination of a hollow head portion having openings therethrough arranged in ninety degree relation with respect to each other, light transmitting means in and closing two of the said openings which are situated in opposed relation to each other, one of the said light transmitting means being of a color to arrest traffic moving toward the same and the other being of a color to permit the forward movement of traffic moving toward the same, sheets of light transmitting material situated in and closing the other two openings, said sheets having means thereon to indicate the direction in which vehicular traffic may move, the outer peripheral edges of said light transmitting means and said sheets being situated inwardly of the walls of the said head, and lighting means within the said head, substantially as and for the purpose described.

In testimony whereof American Gasaccumulator Company has caused its corporate seal to be affixed hereunto, and signed by its president and attested by the signature of its secretary, the 15th day of April, 1924.

[L. S.] AMERICAN GASACCUMULATOR COMPANY,
*Assignee of Elof H. Medin, Deceased,*
By J. G. BERGQUIST,
*President.*

Attest:
W. F. Burk,
*Secretary.*